(12) United States Patent
Maenza et al.

(10) Patent No.: US 6,285,639 B1
(45) Date of Patent: *Sep. 4, 2001

(54) ON-THE-FLY OF JITTER DURING OPTICAL DISC MASTERING/RECORDING

(75) Inventors: Glenn J. Maenza, Glen Mills, PA (US); Edward W. Morton, Turnersville, NJ (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,980

(22) Filed: Apr. 29, 1998

(51) Int. Cl.[7] ........................... G11B 7/00
(52) U.S. Cl. ............... 369/47.28; 369/47.5; 369/53.3; 369/53.34
(58) Field of Search ............. 369/116, 44.37, 369/58, 48, 47, 59

(56) References Cited

U.S. PATENT DOCUMENTS

| | | | |
|---|---|---|---|
| 5,216,660 | * 6/1993 | Iimura | 369/116 |
| 5,375,112 | * 12/1994 | Togawa | 369/44.37 |
| 5,430,704 | * 7/1995 | Maeda | 369/44.37 |
| 5,436,880 | * 7/1995 | Eastman et al. | 369/54 |
| 5,485,441 | * 1/1996 | Maeda | 369/44.37 |
| 5,490,126 | * 2/1996 | Furumiya et al. | 369/44.37 |
| 5,493,554 | * 2/1996 | Sasaki et al. | 369/44.37 |
| 5,495,466 | * 2/1996 | Dohmeier et al. | 369/54 |
| 5,499,227 | * 3/1996 | Higasa | 369/59 |
| 5,675,568 | * 10/1997 | Hajjar et al. | 369/54 |
| 5,856,964 | * 1/1999 | Shtipelman et al. | 369/54 |

* cited by examiner

Primary Examiner—Nabil Hindi
(74) Attorney, Agent, or Firm—Ronald P. Kananen; Rader, Fishman & Grauer

(57) ABSTRACT

A system for the on-the-fly control of jitter during optical disc mastering/recording includes a record disc (24) having a recording surface (26) thereon of the type in which a pit can be read directly after it is written. A write-laser (32) directs its write-beam (34) though an acousto-optic modulator (36) onto the recording surface (26) of the rotating record disc (24). A digital processor (42) accepts digital input values and outputs a signal to the acousto-optic modulator (36) that effectively gates the write-beam (34) on and off. A read-laser (46) is positioned downtrack from the write-laser (32) and reads the pits (16) immediately or shortly after being written by the write-laser (32). The output of the read-laser (46) is fed into a jitter detector (48) that senses the start and stop positions of a sequence of pits (16) and effects an analysis to arrive at a jitter value. A jitter compensator (50) provides a processed correction value to the digital processor (42) which then controls the write-laser (32) to reduce the measured jitter value.

19 Claims, 2 Drawing Sheets

ON-THE-FLY OF JITTER DURING OPTICAL DISC MASTERING/RECORDING

BACKGROUND OF THE INVENTION

The present invention relates to on-the-fly control of jitter during optical disc mastering/recording and, more particularly, to a system for the on-the-fly control of jitter that provides improved control of the start and stop positions of each recorded pit.

Optical discs, including the various types of discs known generically as compact discs and the more recent digital video discs, record digital information streams as a series of pits and lands of selected length with the length of each pit defining a discrete digital value. Typically, optical discs are mass-produced by pressing a metallic master, having the digital information recorded thereon, into a plastic disc to impart the digital information onto the surface of the plastic. The master can be created in a number ways, for example, by spin-coating a glass disc-like substrate with a photoresist material (including, where necessary, a binder layer between the glass surface and the photoresist) and rotating the so-coated substrate while illuminating a selected lineal portion of a spiral track with a laser that exposes the photoresist. The laser is switched on and off in response to the digital data to be recorded with the laser beam repositioned radially along the spiral track. Thereafter, the photoresist is developed to remove unexposed material leaving only hardened photoresist. This photoresist preform is then subjected to one or more plating steps in which a metallic film (principally nickel) is formed on and overlays the photoresist pattern. The metal film is then removed and used as a master for pressing the plastic compact discs.

Various types of errors can be introduced into the recorded information, which errors can interfere with optimal recovery of the recorded information during the read operation. These errors can include, for example, errors in forming the start and the stop positions of the pits. These types of recording errors, known generally as jitter, constitute rapid short-term instabilities in the digital data stream that can compromise the quality of the output signal.

In the above described process, the amount of jitter encoded into the photoresist-covered glass disc cannot be directly measured. It is only after the first disc is pressed from the metal master that a jitter value can be ascertained. Once a jitter value has been determined, adjustments to the recording process can be made to make a subsequent photoresist-covered disc that presumably has a lower jitter characteristic. This process is repeated in an iterative manner until jitter is minimized to an acceptable level.

As can be appreciated, the above process is expensive from both a cost and time standpoint in that each iteration of the process requires formation and exposure of a photoresist-covered glass disc.

SUMMARY OF THE INVENTION

In view of the above, it is an object of the present invention, among others, to provide on-the-fly control of jitter during optical disc mastering/recording to minimize short-term instabilities in the output data.

It is another object of the present invention to provide on-the-fly control of jitter during optical disc mastering/recording to provider higher quality read-data with lower production costs.

In view of these objects, and others, the present invention provides a system for the on-the-fly control of jitter during optical disc mastering/recording. The system includes a write laser that affects the optical characteristics of the recording surface of an optical disc to create pits of selected lengths that correspond to the digital values to be encoded. A read laser is positioned downtrack from the write laser and reads the just-written pits immediately or shortly after being written by the write laser. The output of the read laser is fed into a jitter detector that senses the start and stop positions of the successively written pits and determines a value that corresponds to the jitter characteristic. The output of the jitter detector is provided to a jitter compensator that provides a processed correction value that affects the operation of the write laser to reduce the measured jitter value.

The present invention advantageously provides on-the-fly control of jitter during read-after-write CD and optical disc mastering/recording so that jitter is immediately or near immediately determined after a pit or series of pits are written with the jitter determination used to effect an immediate or near immediate correction of the jitter value.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
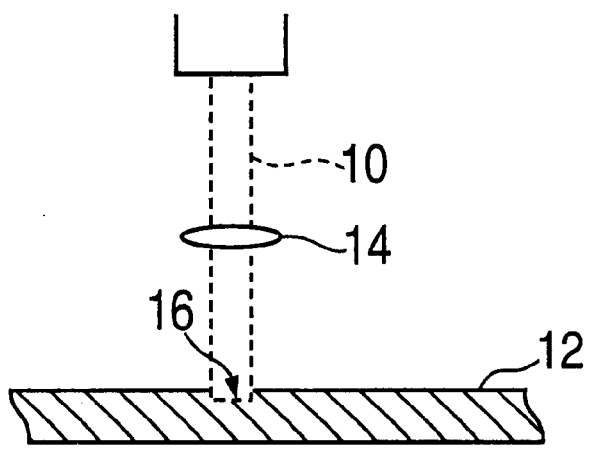
FIG. 1 is a detail view of a write laser beam illuminating a portion of a recording surface of the type having a surface that is optically affected by the laser beam.

An exemplary arrangement for recording digital information on an optically responsive substrate is shown in FIG. 1. As shown, a laser beam 10 is directed onto a recording surface 12 through an appropriate lens 14 to illuminate a portion of the recording surface 12 and to form a pit 16 thereon. The recording surface 12 can take the form of a material whose optical properties are affected by the laser beam 10. In a common technology, the recording surface 12 includes an ablatable metal or metal alloy (nickle, copper, etc.) that is ablated by the absorbed radiation from the laser beam 10. Other recording surface technologies include various types of polymers, dye-treated materials, and the like that undergo a change in optical characteristics under the influence of the laser beam 10. These changes in optical characteristics include, for example, a change in surface reflectivity/absorption and/or light transmission. As the laser beam 10 is switched on and off, typically via an electro-optic or an acousto-optic modulator (not shown) and the recording surface 12 is moved relative to the laser beam 10, a sequence of successive optically discernible "marks" or pits 16 are formed in the recording surface 12.

Figure 2:
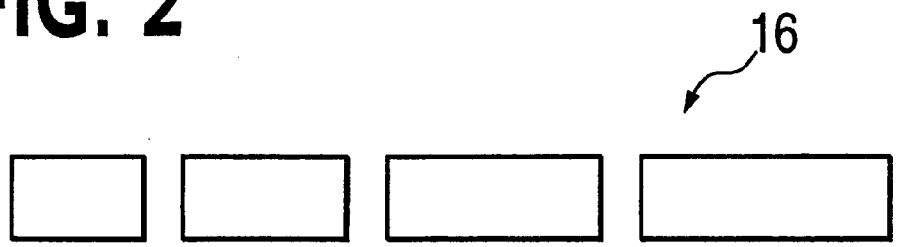
FIG. 2 is an idealized schematic view of a series of pits formed on the recording surface of FIG. 1, each of the pits having a different length.

FIG. 2 illustrates a series of exemplary pits 16 of different discrete lengths formed in the recording surface 12 with each discrete length representing a discrete binary value. In the example shown in FIG. 2, the four pits 16 have lengths corresponding to a 3T, a 4T, a 5T, and a 6T length. In the optical disc recording art, pits 16 having lengths between 3T and 11T are commonly used.

Figure 3:
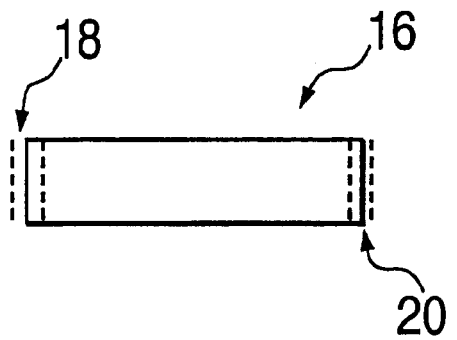
FIG. 3 is a detailed view of one of an exemplary pit illustrating possible variations in the start and stop positions of the pit and thus illustrating the underlying physical basis for jitter.

FIG. 3 illustrated an exemplary 8T pit 16; as shown the 8T pit 16 includes an initially formed start edge 18 and a subsequently formed stop edge 20. The dotted-lines on the opposite sides of the start edge 18 and the stop edge 20 illustrate possible temporal variations in the timing of the start edge 18 and the stop edge 20. These timing variations can occur because of variations in the response times (and combinations thereof) of the various components that control the write laser beam 10. In general, these variations are rarely, if ever, so large that a pit 16, for example, the 8T pit 16 shown in FIG. 3, will be misread as a 7T or a 9T pit. However, the variations in the start edge 18 and the stop edge 20 of a particular pit 16 represent short-term instabilities, i.e., "jitter," that adversely affects the quality of the digital data as it is read from the recording surface 12.

Jitter can be determined by use of a number of known commercial jitter-detectors. The machines read a sequence of pits 16 on a recording surface, identify the start and stop times of each pit, the duration of each pit, and ascertain variations in start edge and stop edge timing for the sampled pits and compute or otherwise ascertain a jitter value.

Figure 4:
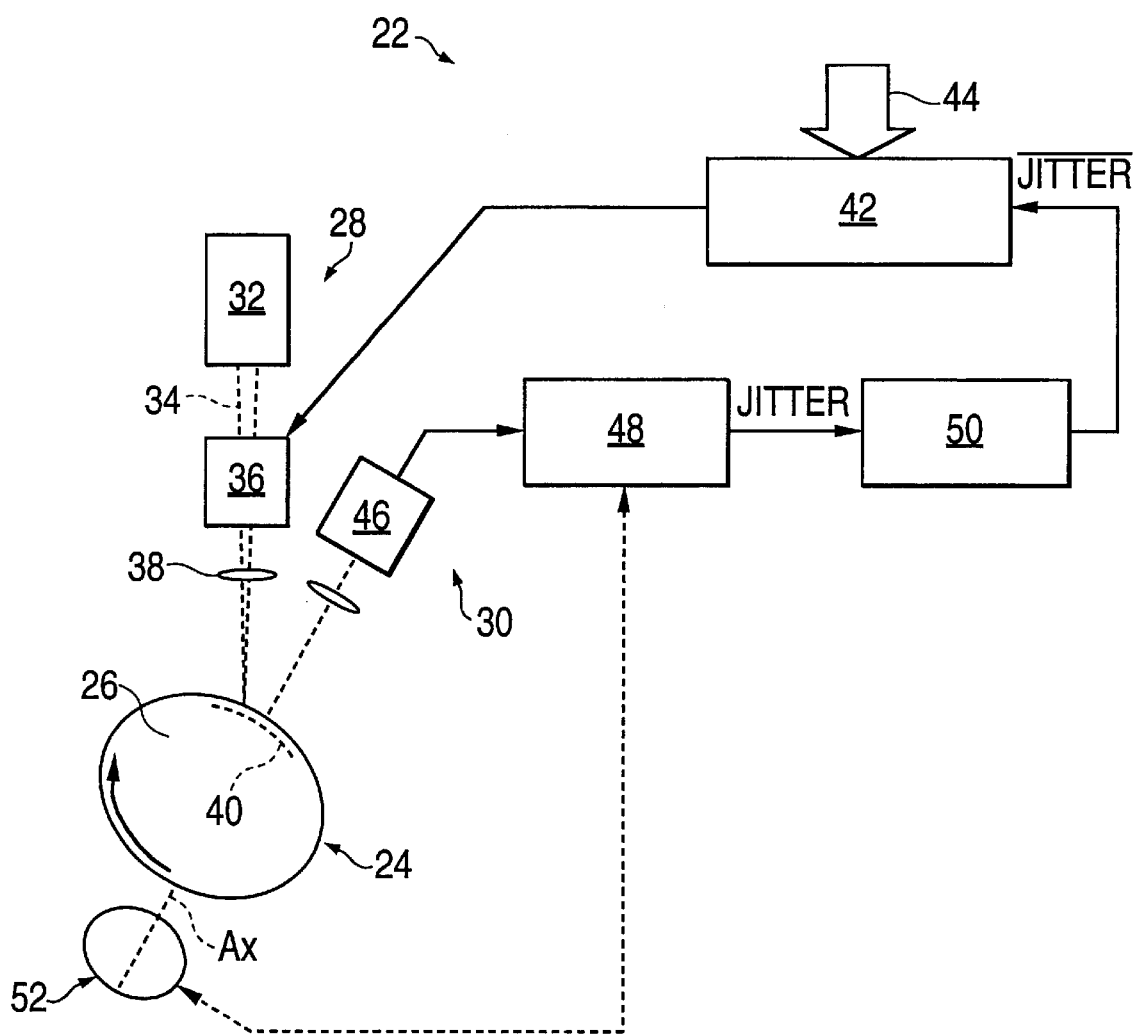
FIG. 4 is a schematic block diagram of a jitter-reduction system in accordance with the present invention.

An exemplary embodiment of on-the-fly jitter control in accordance with the present invention is shown in FIG. 4 and designated generally therein by the reference character 22. As shown, the system 22 includes a record disc 24 having a recording surface 26 thereon of the type in which a pit can be read directly after it is written. The record disc 24 is mounted for rotation in the direction indicated on an axis $A_x$. The system 22 includes a write-subsystem 28 for writing pits 16 and a read-subsystem 30 for reading the pits 16 after they are written.

The write-subsystem 28 includes a write-laser 32 that directs its write-beam 34 through an acousto-optic modulator 36 and a focus lens 38 onto the recording surface 26 of the rotating record disc 24. While not illustrated, the write-subsystem 28 includes conventionally known systems for directing the illumination pattern of the write-laser 32 onto the appropriate track 40 and for following that track 40 during the write sequence. A digital processor 42 accepts digital input values along a digital bus 44 and outputs a signal to the acousto-optic modulator 36 that effectively gates the write-beam 34 on and off.

The read-subsystem 30 include a read-laser 46 that is positioned downtrack from the write-laser 32 and is designed to read the pits 16 immediately or shortly after being written by the write-laser 32. As in the case of the write-subsystem 28, the read-subsystem 30 includes conventionally known structures that cause the read-laser 46 to stay on-track as the pits 16 are read. The output of the read-laser 46 is fed into a jitter detector 48 that senses the start and stop positions of a sequence of pits 16 and effects a variants analysis to arrive at a value characteristic of the jitter for the sequence of pits 16 sampled. A suitable analyzer is the model 704210 analyzer manufactured by the Yokogawa Electric Corporation of Tokyo, Japan. The jitter detector 48 provides an output value, generically characterized by the variable $\overline{\text{JITTER}}$, that is fed into a jitter compensator 50 that, in turn, provides a processed correction value, generically characterized by the variable $\overline{\text{JITTER}}$, to the digital processor 42 which then affects the write-laser 32 to reduce the measured jitter value.

In the most generic form, the correction value $\overline{\text{JITTER}}$ can be a value that is the inverse of the measured $\overline{\text{JITTER}}$ variable; however, the correction value $\overline{\text{JITTER}}$ can include other second- and higher-order correction-factors that reduce the jitter. For example, where the jitter detector 48 determines that the start edge 18 for the sampled pits 16 are late (i.e., lagging) and that the stop edge 20 is early (i.e., leading), the correction value can appropriately bias subsequently written pits 16 with a 'leading' correction factor to compensate for the measured lagging value and a 'lagging' correction factor to (otherwise known as effect length) compensate for the measured leading value. In a more sophisticated approach, the FFT of the measured JITTER can serve as a basis for a corresponding inverse correction value. The jitter compensator 50 can take the form of a stored-program controlled processor, programmed logic arrays (PLA's), discrete logic devices, or a combination thereof.

The jitter detector 48 discussed above samples a sequence of pits 16 and effects a variants analysis over the sampled pits to determine jitter. As shown in dotted-line illustration in FIG. 4, a high-resolution encoder 52, such as an optical shaft encoder, can be used to determine the absolute rotary angular position of the record disc 24 relative to an initial position so the start edge 18 and the stop edge 20 of each pit 16 can be similarly determined relative to the encoder 52 and a jitter value for each pit 16 can be uniquely determined. That pit-by-pit jitter value can then be inputted into the jitter detector 48.

The present invention advantageously provides an on-the-fly control of jitter during read-after-write CD mastering/recording so that jitter is immediately or near immediately determined after a pit or series of pits are written with that jitter determination used to effect an immediate or near immediate correction of the jitter value.

As will be apparent to those skilled in the art, various changes and modifications may be made to the illustrated on-the-fly control of jitter during optical disc mastering/recording of the present invention without departing from the spirit and scope of the invention as determined in the appended claims and their legal equivalent.

What is claimed is:

1. A system for controlling jitter on an optical disc, comprising:

an optical write device for illuminating a portion of a track on a recording media to selectively change a characteristic of the recording media to create successive recorded indicia having respective start and stop positions;

an optical read device positioned downtrack from said write device for reading said start and stop positions after being written by said write device;

means for determining the positioning of said recording media relative to said start and stop positions;

means for detecting said jitter, said detecting means receiving said positioning of said recording media from said determining means and said start and stop positions from said read device, and performing a variants analysis upon said start and stop positions;

means for determining a correction value based upon said variants analysis; and means for providing said correction value to said optical write device to reduce said jitter.

2. The system of controlling jitter of claim 1, wherein said optical write device includes a selectively controllable laser beam to effect illumination of a selected portion of the track area of the recording media.

3. The system of controlling jitter of claim 2, wherein said optical write device includes an acousto-optical modulator for modulating the laser beam on and off.

4. The system of controlling jitter of claim 1, wherein said optical read device evaluates a plurality of successive recorded indicia to ascertain said jitter characteristic.

5. The system of controlling jitter of claim 4, wherein the inverse of said ascertained jitter characteristic is provided to said optical write device to effect control of said jitter characteristic.

6. A system for controlling jitter on an optical disc, comprising:

means for illuminating a portion of a track on a recording media with an energy beam to selectively change a characteristic of the recording media to create successive recorded indicia having respective start and stop positions;

means, positioned downtrack from said illuminating means, for reading said start and stop positions;

means for determining the positioning of said recording media relative to said start and stop positions;

means for detecting said jitter, said detecting means receiving said positioning of said recording media from said determining means and said start and stop positions from said read device, and performing a variants analysis upon said start and stop positions;

means for determining a correction value based upon said variants analysis; and means for providing said correction value to said illuminating means to reduce said jitter.

7. The system of controlling jitter of claim 6, wherein said first-mentioned means includes a selectively controllable laser beam to effect illumination of a selected portion of the track area of the recording media.

8. The system of controlling jitter of claim 7, wherein said first-mentioned means includes an acousto-optical modulator for modulating the laser beam on and off.

9. The system of controlling jitter of claim 6, wherein said second-mentioned means evaluates a plurality of successive recorded indicia to ascertain said jitter characteristic.

10. The system of controlling jitter of claim 9, wherein the inverse of said ascertained jitter characteristic is provided to said first-mentioned means to effect control of said jitter characteristic.

11. A method for controlling jitter during the recording of an optical disc, comprising the steps of:

recording successive indicia on a track portion of an optical recording media, the successively recorded indicia having respective start and stop positions;

reading said start and stop positions to ascertain said jitter associated therewith;

determining the positioning of said recording media relative to said start and stop positions;

determining a jitter-correction value as a function of the jitter and the positioning of said recording media relative to said start and stop positions; and using the jitter-correction value to control said recording.

12. A system for controlling jitter of claim 1, further comprising:

means for determining angular positions of each successive recorded indicia and providing the angular positions to said correction value determining means.

13. A system for controlling jitter of claim 6, further comprising:

means for determining angular positions of each successive recorded indicia and providing the angular positions to said second-mentioned means.

14. A method for controlling jitter of claim 11, further comprising the steps of:

determining angular positions of each successive recorded indicia, wherein the jitter-correction value is determined as a function of the ascertained jitter value and the angular positions.

15. A system for controlling jitter on an optical disc, comprising:

an optical laser recording device;

an optical laser reading device;

an encoder that determines the rotary angular position of said optical disc;

a jitter detector having an input connected to said optical laser reading device, and an input connected to said encoder;

a jitter compensator having an input connected to said jitter detector; and a processor having an input connected to said jitter compensator and an output for controlling said optical laser recording device.

16. The system for controlling jitter of claim 15, wherein said jitter compensation controller comprises:

a jitter detector connected to receive the optical laser reading device output signal, said jitter detector generating a jitter value signal;

a jitter compensator connected to receive the jitter value signal, said jitter compensator generating a jitter correction value signal; and a processor connected to receive the jitter correction value signal, said processor generating a processed correction value signal as the control signal.

17. The system for controlling jitter of claim 15, wherein said optical laser recording device comprises:

a write laser;

an acousto-optical modulator receiving a laser beam emitted from said write laser, and connected to receive the control signal; and a focus lens receiving a modulated laser beam from said acousto-optical modulator.

18. The system for controlling jitter of claim 15, further comprising:

an encoder circuit, said encoder circuit generating an angular position signal and outputting the angular position signal to said jitter compensation controller.

19. A system for controlling jitter on an optical disc, comprising:

an optical write device for illuminating a portion of a track on a recording media to selectively change a characteristic of the recording media to create successive recorded indicia having respective start and stop positions;

an encoder for determining the rotary angular position of said recording media;

an optical read device positioned downtrack from said write device, said read device reads a sequence of said start and stop positions;

a jitter detector that receives a jitter value from said encoder, senses the start and stop positions, and performs a variants analysis upon said start and stop positions; and a jitter compensator connected to said write device, wherein the output of said jitter detector is fed into said jitter compensator, said jitter compensator provides a processed correction value to said write device to reduce jitter during the operation of said write device.

* * * * *